3,041,245
COMPOSITION FOR THE CARE OF THE SKIN
Johannes Keck and Hagen Tronnier, Biberach an der Riss, Germany, assignors to Dr. Karl Thomae, G.m.b.H., Biberach an der Riss, Germany, a corporation of Germany
No Drawing. Filed June 25, 1959, Ser. No. 822,723
Claims priority, application Germany Sept. 10, 1958
3 Claims. (Cl. 167—90)

This invention relates to a process for treating the skin with a steriod hormone-free, albumin-containing active substance extracted from ovaries and placenta to effect a drawing up or tightening of the skin surface giving a more youthful appearance to the skin.

It is already known that extracts from animal organs, such as testicles, ovaries, placentas, pancreas or liver, can be incorporated into compositions for the care of the skin (see, for example, French Patent 1,022,719). These extracts contain all the steroid hormones present in these organs in enriched form. Thus, by analysis of a placenta extract, the presence of 17-keto-steroids, corticosteroids and total steroids in such skin treating compositions was determined [H. Gohlke, Med. Kosmetik, 7, 139–143 (1958)]. Many other customary compositions for the care of the skin also contain steroids, as active ingredients [see, for example, German published patent application C 8373 IVa/30h]. However, compositions for skin treatment containing steroid hormones exhibit undesirable side effects [Acta paediat, 41, 177–185 (1952); Zbl. Hautund Geschlechtskrankheiten, 83, 15 (1953); Schweizer Med. Wochenschrift, 83, 81–84 (1953)].

It is also known from German Patent No. 964,172 that compositions for the care of the skin can be used which contain hormone-free extracts from muscles of young animals.

An object of our invention is to reduce skin folds and wrinkles and to cause the skin surface to have a more youthful appearance by applying to the skin surface, in a suitable vehicle, an albumin-containing, steroid hormone-free active substance extracted from animal organs selected from the group consisting of ovaries and placenta.

We have found that albumin-containing, steroid hormone-free active substances extracted from ovaries and placentas exhibit a well-defined effect upon the skin when applied to the skin in the form of the customary skin treating compositions.

The albumin-containing, steroid hormone-free active substance used in accordance with the present invention may, for example, be obtained by extraction of pigs' ovaries or placenta with the aid of acidic, aqueous, water-miscible organic solvents such as an acidic water-acetone solution or with the aid of acidic, aqueous solutions alone. The active substance is separated directly from the extract by addition of a large volume of a water-miscible organic solvent, such as acetone, whereby the active substance is precipitated. This extraction, described in the copending application S.N. 768,012, filed October 20, 1958, in the name of Dr. Keck, is briefly set forth below.

The process may be carried out with comminuted animal organs selected from the group consisting of ovaries and placenta. While any source of these organs can be employed, those organs obtained from swine are both inexpensive, readily available, and give high yields. It is not necessary to utilize ovaries from pregnant swine, although such ovaries give a slightly higher yield of an active substance having a high activity per mg. One usually uses non-select ovaries, that is, all ovaries as they occur, with excellent results.

The process is generally carried out at room temperature, but temperatures somewhat above or below room temperature may also be used. The period of extraction may be varied within wide limits. Particularly favorable results may be achieved with extraction periods of 5–25 hours at room temperature.

Acetone is advantageously used as the water-miscible organic solvent for the extraction of the ovaries or the placenta tissue. The extraction is preferably carried out with acetone having a water content of 20–80% and an acid content between 0.01 N and 1.0 N based on the total solvent, preferably with an acid content between 0.05 N and 0.4 N. However, other water-miscible organic solvents may also be used, such as methanol, ethanol, dioxane, tetrahydrofuran, acetonitrile and the like in the form of aqueous solutions with the above content of water.

For the performance of the extraction with acidic aqueous solutions alone, an acid having a normality between 0.01 N and 1.0 N and preferably between 0.05 N and 0.5 N in water is used. Hydrochloric acid has been found to be particularly suitable. However, other mineral acids, such as sulfuric acid, phosphoric acid, or organic acids, such as acetic acid, may also be used in the extraction process both in the embodiment using acid and water alone or the embodiment using water, a water-miscible organic solvent and an acid.

The extract solutions thus obtained are then directly admixed with a large volume of a water-miscible organic solvent for the purpose of separating out the active substance as a precipitate. For this purpose acetone again can be advantageously used. Depending upon the particular solvent content of the extract, from 4 to 10 times the volume of the solvent is added for precipitation of the active substance. Examples of other suitable water-miscible organic solvents for use in the precipitation step are acetonitrile, dioxane, and tetrahydrofuran and the like. It is not necessary to precipitate the active substance with the same solvent as was used in the extraction step.

Since the steroid hormones present in ovaries and placenta, such as estradiol, estriol, progesterone, etc., are insoluble in water and soluble in volatile solvents such as acetone, the above method of extraction and purification would extract only albumin-like compounds and leave steroid hormones behind.

We have found that when the albumin-containing, steroid hormone-free active substances prepared according to the above process are applied to the skin surface in suitable cosmetic vehicles, such as water-in-oil emulsions, oil-in-water emulsions, glycerine jellies or face lotions, there is effected a drawing up or tightening of the skin surface, causing a distinct reduction in the skin folds and wrinkles. Thus a more youthful appearance of the skin is achieved.

This effect upon the skin can be accurately proven by the following method:

A short rod carrying a weight of 0.1 gm. is drawn over the skin surface, and its deviations are electromagnetically transferred, amplified and directly registered on a paper strip. A relief of the skin surface is thus obtained [Parfumerie u. Kosmetik, 39, page B 69/589 (1958)].

If, with the aid of the above method, an ointment base containing an albumin-containing, steroid hormone-free active substance extracted from ovaries or placenta is compared directly with the ointment base alone, or with the muscle extract according to German Patent No. 964,172, the surprising and unexpected advantages of treating the skin with such compositions, containing the active substance according to the present invention are clearly brought out.

In the following table, the width and depth of skin folds were measured before and after treatment with the various ointments and the differences were observed. In each case, the same amount of ointment was applied to the skin and allowed to remain for 60 minutes before washing and drying and 24 hours before remeasuring the skin. The ointment used had the following composition:

| | Parts |
|---|---|
| Wool grease | 1.0 |
| Ceresin (54–56° C.) | 2.0 |
| Paraffin oil | 37.0 |
| Alkyl-substituted polycondensation product of ethylene oxide | 5.0 |
| High-molecular-weight phosphoric acid ester | 5.0 |
| Sorbitol (80%) | 5.0 |
| Distilled water and perfume to make | 100.0 |

To this ointment were added five parts of the various extracts compared below.

| Treatment of skin with— | Width of skin fold, μ | | Difference, μ | Depth of skin fold, μ | | Difference, μ |
|---|---|---|---|---|---|---|
| | Before treatment | After treatment | | Before treatment | After treatment | |
| Ointment base | 119.2 | 121.3 | +2.1 | 55.2 | 54.5 | −0.7 |
| Muscle extract according to German Patent No. 964,172 | 118.5 | 115.5 | −3.0 | 41.6 | 38.1 | −3.5 |
| Placenta extract of invention | 138.0 | 134.8 | −3.2 | 58.8 | 44.4 | −14.4 |
| Ovaries extract of invention | 184.0 | 176.7 | −7.3 | 149.0 | 102.0 | −47.0 |

A further advantage of the active substances used according to the present invention over steroid-containing extracts from animal organs is that they do not exhibit any side effects, even upon prolonged, regular use.

The extracted active substance may be added in any amount to the customary skin treating cosmetics. Of course, compatibility with various cosmetics may vary and limit the maximum amount that can be incorporated. We have found that a range of from 0.5% to 10% by weight of the total weight is preferred, although this depends somewhat upon the consistency, etc. of the cosmetic base. Since no adverse side effects occur, the amount of active substance applied to the skin surface can be as much or as little as desired.

The following examples illustrate a few typical cosmetic composition embodiments of the active substances to be applied to skin surfaces in accordance with the present invention. These compositions are not to be considered limiting and any neutral vehicle compatible with the active substance and capable of carrying the active substance to the skin surface would be equally effective.

EXAMPLE 1

*Water-in-Oil Emulsion*

| | Parts |
|---|---|
| Albumin-containing, steroid free active substance extracted from ovaries by the process indicated above | 5.0 |
| Wool grease | 1.0 |
| Ceresin (54–56° C.) | 2.0 |
| Paraffin oil | 37.0 |
| Cremophor A solid [1] | 5.0 |
| High-molecular-weight phosphoric acid ester | 5.0 |
| Sorbitol (80%) | 5.0 |
| Distilled water and perfume to make | 100.0 |

[1] Alkyl-substituted polycondensation product of ethylene oxide.

The emulsion is applied to the skin surface in the customary manner and a decrease in width and length of skin folds is observed.

EXAMPLE 2

*Oil-in-Water Emulsion*

| | Parts |
|---|---|
| Albumin-containing, steroid hormone free active substance extracted from placenta by the process indicated above | 2.0 |
| Stearic acid | 4.3 |
| Isopropylmyristate | 12.5 |
| Olive oil | 20.0 |
| Sodium lauryl sulfate | 1.3 |
| Sorbitol (80%) | 3.0 |
| Distilled water and perfume to make | 100.0 |

The emulsion is applied to the skin surface in the customary manner and a decrease in width and length of skin folds is observed.

EXAMPLE 3

*Glycerine Jelly*

| | Parts |
|---|---|
| Sodium alginate | 2.5 |
| Distilled water | 63.5 |
| Calcium citrate | 0.2 |
| Albumin-containing steroid hormone-free active substance extracted from ovaries by the process indicated above | 2.5 |
| Glycerine | 20.0 |
| Distilled water and perfume to make | 100.0 |

The jelly is applied to the skin surface in the customary manner and a decrease in width and length of skin folds is observed.

EXAMPLE 4

*Face Lotion*

| | Parts |
|---|---|
| Alcohol | 35.0 |
| Boric acid | 1.0 |
| Albumin-containing steroid hormone-free active substance extracted from ovaries by the process indicated above | 1.0 |
| Distilled water and perfume to make | 100.0 |

The lotion is applied to the skin surface in the customary manner and a decrease in width and length of skin folds is observed.

The above examples illustrate several of the compositions useful in the process of our invention. It is readily apparent to one skilled in the art that other substitutions, changes and modifications of our invention are possible without departing from the spirit of the invention or the scope of the following claims.

We claim:

1. The method of decreasing the width and depth of skin folds and wrinkles which comprises applying an effective amount of an albumin-containing, steroid hormone-free extract to the skin, said extract having been obtained by extracting animal organs selected from the group consisting of ovaries and placenta with an acidic solvent of 20 to 100% water and 0 to 80% of a water-miscible organic solvent selected from the group consisting of lower alkanols, acetone, dioxane, tetrahydrofuran and acetonitrile, said acidic solvent having a 0.01 to 1.0 N acid concentration, separating the extract solution from the extracted animal organs and precipitating said extract without further purification from the solution by adding to said solution from 4 to 10 times the volume of said extract solution a water-miscible organic solvent selected from the group consisting of lower alkanols, acetone, dioxane, tetrahydrofuran and acetonitrile.

2. The method of claim 1 wherein the active substance is incorporated in a suitable cosmetic vehicle and applied to the surface of the skin.

3. The method of claim 1 wherein said water-miscible, organic solvent is acetone.

References Cited in the file of this patent
UNITED STATES PATENTS

| | | |
|---|---|---|
| 2,852,431 | Kroc | Sept. 16, 1958 |
| 2,964,448 | Anschel | Dec. 13, 1960 |

OTHER REFERENCES

Ultima: Advertisement, rec'd. January 20, 1959, 1 page.

Gohlke: The Amer. Perf. & Ess. Oil Review, 63: 2; February 1954, pages 97–100.

Casten: J.A.M.A., 166: 4, January 25, 1958, pages 319–324.

Felton: J. Pharm. and Exptl. Therap. 107: 2, February 1953, pages 160–164.